United States Patent [19]

Stanish et al.

[11] Patent Number: 5,948,495
[45] Date of Patent: *Sep. 7, 1999

[54] CERAMIC-METAL MATRIX COMPOSITES FOR MAGNETIC DISK SUBSTRATES FOR HARD DISK DRIVES

[75] Inventors: Raymond L. Stanish, Palmdale; William C. Harrigan, Northridge; Robin A. Carden, Costa Mesa, all of Calif.

[73] Assignee: Alyn Corporation, Irvine, Calif.

[ * ] Notice: This patent is subject to a terminal disclaimer.

[21] Appl. No.: 08/795,384

[22] Filed: Feb. 4, 1997

Related U.S. Application Data

[63] Continuation-in-part of application No. 08/674,140, Jul. 1, 1996, Pat. No. 5,712,014.

[51] Int. Cl.⁶ .................................................... G11B 5/82
[52] U.S. Cl. ................. 428/64.1; 428/65.6; 428/332; 428/469; 428/539.5; 428/694 ST; 428/698; 428/900; 360/135
[58] Field of Search .............................. 428/65.6, 539.5, 428/694 ST, 698, 900, 64.1, 332, 469; 360/135

[56] References Cited

U.S. PATENT DOCUMENTS

| | | | |
|---|---|---|---|
| 4,605,440 | 8/1986 | Halverson et al. | 75/238 |
| 4,623,388 | 11/1986 | Jatkar et al. | 75/232 |
| 4,738,885 | 4/1988 | Matsumoto | 428/64 |
| 4,749,545 | 6/1988 | Begg et al. | 419/13 |
| 4,793,967 | 12/1988 | Pryor et al. | 419/19 |
| 4,808,463 | 2/1989 | Yoshikatsu et al. | 428/215 |
| 4,825,680 | 5/1989 | Coe et al. | 72/359 |
| 4,946,500 | 8/1990 | Zedalis et al. | 75/232 |
| 4,961,778 | 10/1990 | Pyzik et al. | 75/230 |
| 5,039,633 | 8/1991 | Pyzik et al. | 501/93 |
| 5,045,278 | 9/1991 | Das et al. | 419/16 |
| 5,438,204 | 8/1995 | von Bunau et al. | 250/492.2 |
| 5,480,695 | 1/1996 | Tenhover et al. | 428/65.5 |
| 5,486,223 | 1/1996 | Carden | 75/244 |
| 5,487,931 | 1/1996 | Annacone et al. | 428/64.1 |

OTHER PUBLICATIONS

"Magnetic film deposition for Winchester hard discs" in *The CD–ROM and Optical Disc Recording Systems* by E.W. Williams, Oxford University Press, 1994, pp. 86–88.

"Magnetic Recording" by J. Mallinson and R. Wood in *McGraw–Hill Yearbook of Science & Technology 1993*, McGraw–Hill, Inc., 1992, pp. 209–212.

*Primary Examiner*—Stevan A. Resan
*Attorney, Agent, or Firm*—Cooper & Dunham LLP

[57] ABSTRACT

A rigid disk substrate for a magnetic recording disk is formed of a ceramic-metal matrix composite. The ceramic-metal matrix composite has a composition ranging from approximately 1 to 40 weight % of ceramic material and 60 to 99 weight % of aluminum or aluminum alloy metal matrix. The ceramic material may be silicon carbide, aluminum oxide, boron carbide, magnesium oxide, silicon oxide, silicon nitride, zirconium oxide, beryllium oxide, titanium boride, titanium carbide, tungsten carbide, or combinations thereof.

9 Claims, 6 Drawing Sheets

CERAMIC-METAL MATRIX COMPOSITES FOR MAGNETIC DISK SUBSTRATES FOR HARD DISK DRIVES

CROSS-REFERENCE TO RELATED APPLICATIONS

This is a continuation-in-part of application Ser. No. 08/674,140 filed Jul. 1, 1996, now U.S. Pat. No. 5,712,014.

BACKGROUND

The present invention relates generally to rigid disk substrates for use in magnetic recording applications. More specifically, the present invention relates to a substrate formed of a ceramic-metal matrix composite.

Personal computers have become common tools for data manipulation and data storage. Computers store and retrieve data using magnetic recording technology, where a magnetic film supported on a rigid disk substrate is used as the recording medium.

Magnetic recording involves use of a head, which includes a ring of magnetic material having a very narrow gap and a wire wrapped around the ring. To record or write information, a current is passed through the wire to generate a very intense field in the vicinity of the gap. If a recording medium is passed very close to the gap, it becomes permanently magnetized in response to the current. The recording is retrieved or played back by moving the recorded medium past the head and recovering the small voltage induced in the wire caused by a change in flux through the ring as the recorded magnetic information passes by the gap.

The storage capacity of typical magnetic recording disks used in personal computer hard disk drives has grown by over 70% per year from 1980 to 1991, and continues to have a high growth rate today. The density at which information can be recorded (written) and reproduced (read) on a disk surface is determined by the dimensions of the head and the accuracy with which the head can be positioned, by the magnetization level that can be achieved in the recording medium, and by the accuracy and sophistication of the reproduction electronics.

Data are recorded on the surface of a disk spinning typically at rotation speeds of approximately 5400 revolutions per minute (rpm). To avoid contact and wear, the head is designed as a slider that glides or flies just above the disk surface. Very high linear track densities can be achieved by reducing the separation between the head surface and the recording medium, thus increasing the storage capacity of the disk.

Therefore, to maximize the resolution in writing and reading and hence maximize the storage capacity of a disk, it is necessary to have a very small head with a very small gap and a very narrow track width within which information is recorded. Most importantly, it is necessary to have an extremely small flying height or separation between the head surface and the recording medium. Both the field intensity during writing and the sensitivity during reading drop dramatically as the flying height increases beyond about one-third the length of the smallest piece of recorded information. In addition, future generations of recording heads may actually be designed to contact the disks during operation. Therefore, surface roughness of the disks is extremely critical, and surfaces must be optically smooth because the bit lengths are of the same order of magnitude as the wavelength of light. Further, disk deflection during rotation, described hereinbelow, must be eliminated.

As shown in FIG. 1, a typical magnetic recording disk 1 used today is comprised of a rigid disk substrate 3 made of an aluminum-magnesium (Al—Mg) alloy, a nickel-phosphorous (Ni—P) layer 5 covering the Al—Mg substrate, a magnetic recording layer 7 covering the Ni—P layer, and a carbon-based protective layer 9 covering the magnetic recording layer. The Ni—P layer 5 serves as a hard coating that protects the Al—Mg substrate and also is generally used for texturing the surface of the substrate 3 before the magnetic recording layer 7 is deposited. Texturing produces a grooved surface which assists and improves head aerodynamics.

A current trend in disk drive technology is to optimize rigid disk substrates by making them thinner, more rigid, and harder so that more disks can be stacked within a given space and also so that they can withstand handling when used in portable disk drives. Preferably, the substrates would have a high specific modulus of elasticity $E/\rho$, where E is the modulus of elasticity and $\rho$ is the density of the substrate material, at a substrate thickness that is less than 1 mm. A typical thickness of a conventional Al—Mg substrate ranges roughly from 0.6 to 0.9 mm. Hardness is important because a recording head is subject to head "slaps" or contacts with a spinning disk. These slaps can have a force of 500 to 1000 G. Head slaps are particularly prevalent in conventional Al—Mg substrates due to air turbulence-induced deflections. Because of these deflections, a conventional substrate will not have a flat profile while spinning, but will have a slight wobble causing the substrate to slap the head if the amount of wobble exceeds the flying height of the head.

Another consideration in choosing an alternative and improved rigid disk substrate material is its compatibility with standard deposition processes used to deposit the various layers in a magnetic recording disk, including the Ni—P layer, the magnetic recording layer, and the protective coating layer.

In view of the above-mentioned problems and considerations, the present invention contemplates a ceramic-metal matrix composite for use as a rigid disk substrate. The ceramic-metal matrix composite is comprised of a metal matrix material to which is added a ceramic material to improve mechanical properties such as strength and hardness of the metal matrix material, for example. The ceramic-metal matrix composite of the present invention is stronger, stiffer, and exhibits other significant improvements over materials used in conventional Al—Mg rigid disk substrates at a comparable cost.

One ceramic-metal matrix composite material which could be used for the product contemplated by the present invention is described in U.S. Pat. No. 5,486,223, which is incorporated herein by reference.

In recent years ceramic-metal matrix composites have become desirable materials because of improvements in stiffness, strength, and wear properties. Basic ceramic-metal matrix composites are made typically with aluminum, titanium, magnesium, or alloys thereof as the metal matrix material. A selected percentage of ceramic material, within a specific range, is added to the metal matrix material to form the composite. Typical ceramic additives include boron carbide, silicon carbide, titanium diboride, titanium carbide, aluminum oxide, and silicon nitride.

Most known ceramic-metal matrix composites are made by a conventional process that introduces the ceramic material into a molten metal matrix. In order for the improved properties to be realized, the molten metal generally must wet the ceramic material so that segregation or clumping of the ceramic material is minimized. Numerous schemes with varying degrees of success have been utilized to improve the dispersion of the ceramic material in the molten metal.

Recently, powder metallurgy consolidation has emerged as an attractive alternative method for fabricating metal matrix composites, where the powders are compacted by means of hot pressing and vacuum sintering to achieve a high density billet. By following certain pressing and sintering techniques and standard metal working techniques, a billet of over 99% theoretical density can be achieved.

One problem encountered in composites of aluminum and certain ceramic materials is the thermodynamic instability of those ceramic materials in molten aluminum heated to excessively high temperatures. This instability leads to the formation of unwanted precipitates at grain boundary interfaces, which are believed to have detrimental effects on the mechanical properties of the resulting composite.

OBJECTS AND SUMMARY OF THE INVENTION

In view of the aforementioned shortcomings of conventional rigid disk substrates, it is an object of the present invention to provide a substrate for magnetic recording media formed of a ceramic-metal matrix composite, the substrate being particularly suitable for use in magnetic recording disks for hard disk drives.

It is another object of the present invention to provide a rigid disk substrate that substantially reduces deflection at disk rotation speeds from 0 through 12,000 rpm.

It is yet another object of the present invention to provide a rigid disk substrate that can be easily ground and polished to have proper surface requirements.

It is also an object of the present invention to provide a rigid disk substrate formed of a ceramic-metal matrix composite, where the substrate is compatible with standard thin film deposition processes for magnetic recording disks.

The ceramic-metal matrix composite can be formed by any of the known techniques for producing such composites, including powder metallurgical techniques and techniques involving melting of the metal matrix material.

As an example, the ceramic-metal matrix composite of the present invention may be formed by blending and uniformly mixing together powders of ceramic and metal matrix material. The blended powders are then sintered to form a solid billet of ceramic-metal matrix composite.

Alternatively, the ceramic-metal matrix composite of the present invention may be formed by combining ceramic material with molten metal matrix material and solidifying the combination to form a solid billet of ceramic-metal matrix composite.

One such ceramic-metal matrix composite, made using boron carbide ceramic material and an aluminum alloy metal matrix material, was found to be lighter, stronger, stiffer, and have higher fatigue strength than any of the 7000-series aluminum alloy materials. In addition, this composites was found to be lighter, stronger, stiffer, and have greater fatigue strength than most other metal matrix composites available. Further, this composite was found to exhibit a tensile strength of up to 108 kpsi, a yield strength of up to 97 kpsi, and a modulus of elasticity of about 14 to 22 Mpsi. This composite was also found to be readily extrudable and machinable.

The following is an illustrative example of the present invention.

According to an aspect of the present invention, a rigid disk substrate is made of a ceramic-metal matrix composite wherein the metal matrix material is aluminum or an aluminum alloy. The composite is formed by blending powders of a ceramic material and the metal matrix material to uniformly mix the powders, and then subjecting the powders to high pressures to transform the powders into a solid billet that can be extruded, cast, forged, and manufactured into rigid disk substrates for magnetic recording disks. Such disks can be rotated from 0 through 12,000 rpm and exhibit significantly reduced deflection characteristics compared with conventional disk substrates. Ceramic materials applicable for forming ceramic-metal matrix composites for rigid disk substrates include, but are not limited to: silicon carbide; aluminum oxide; boron carbide; magnesium oxide; silicon oxide; silicon nitride; zirconium oxide; beryllium oxide; titanium boride; titanium carbide; tungsten carbide; and combinations thereof.

DETAILED DESCRIPTION OF PREFERRED EMBODIMENTS

Figure 1:
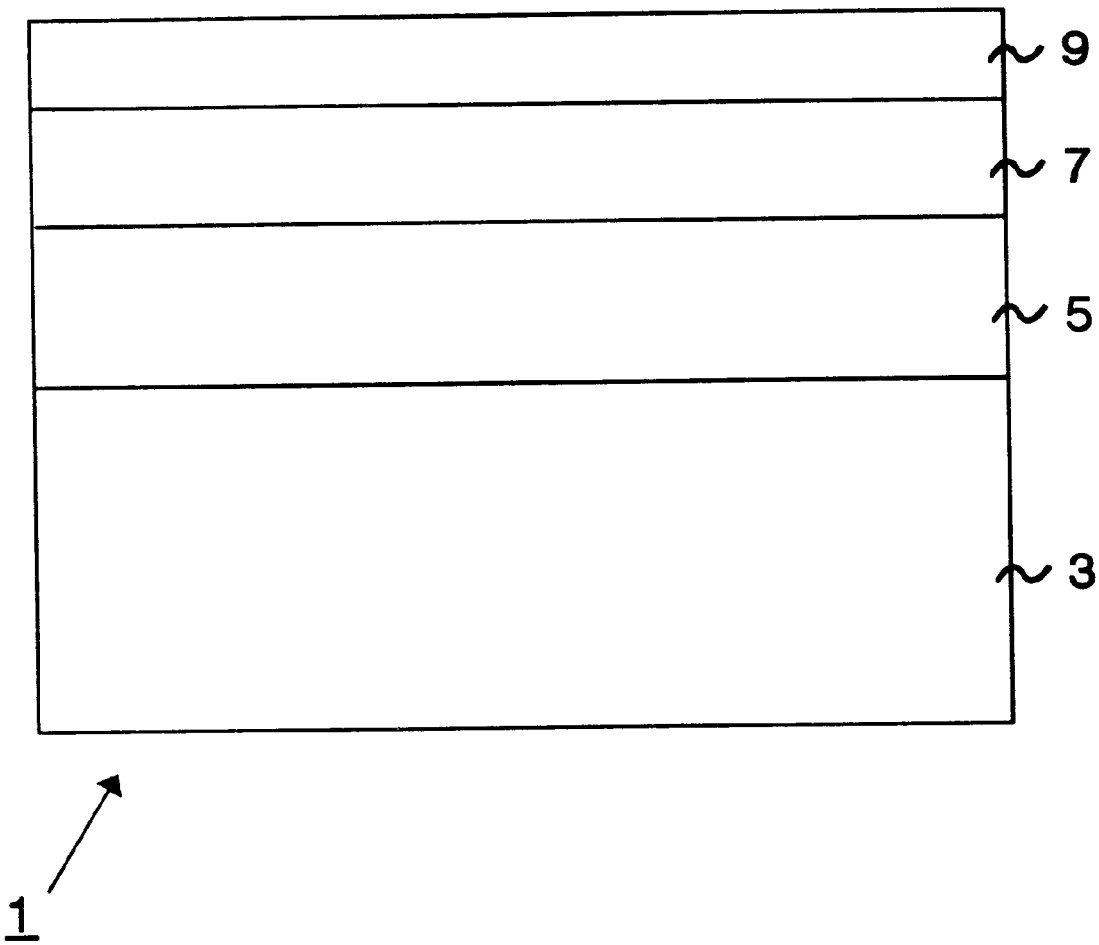
FIG. 1 is an elevational view of a cross section of a conventional magnetic recording disk.

Preferred embodiments of the present invention are described below with reference to the accompanying drawings, in which like reference numerals represent the same or similar elements.

In one embodiment of the present invention, a rigid disk substrate is formed of a ceramic-metal matrix composite wherein the metal matrix material is aluminum or an aluminum alloy having a purity of approximately 97% when in powder form. The balance of the metal matrix material may contain trace amounts of various elements such as chromium, copper, iron, magnesium, silicon, titanium, and zinc. The ceramic material may be silicon carbide, aluminum oxide, boron carbide, magnesium oxide, silicon oxide, zirconium oxide, beryllium oxide, titanium carbide, titanium boride, tungsten carbide, or combinations thereof. According to a preferred embodiment, the ceramic powder has a particulate size typically in the range of 2 to 19 $\mu$m, with a mean or average particulate size of about 5 to 8 $\mu$m.

A typical relative weight contribution of the ceramic powder and the metal matrix powder is approximately 1 to 40% ceramic material and 60 to 99% metal matrix material.

The ceramic-metal matrix composite can be formed by any of the known techniques for producing such composites, including powder metallurgical techniques and techniques that involve melting of the metal matrix material.

As an example, the ceramic-metal matrix composite of the present invention may be formed by blending and uniformly mixing together powders of ceramic and metal matrix material. The blended powders are then sintered to form a solid billet of ceramic-metal matrix composite.

Alternatively, the ceramic-metal matrix composite of the present invention may be formed by combining ceramic material with molten metal matrix material and solidifying the combination to form a solid billet of ceramic-metal matrix composite.

Figure 2:
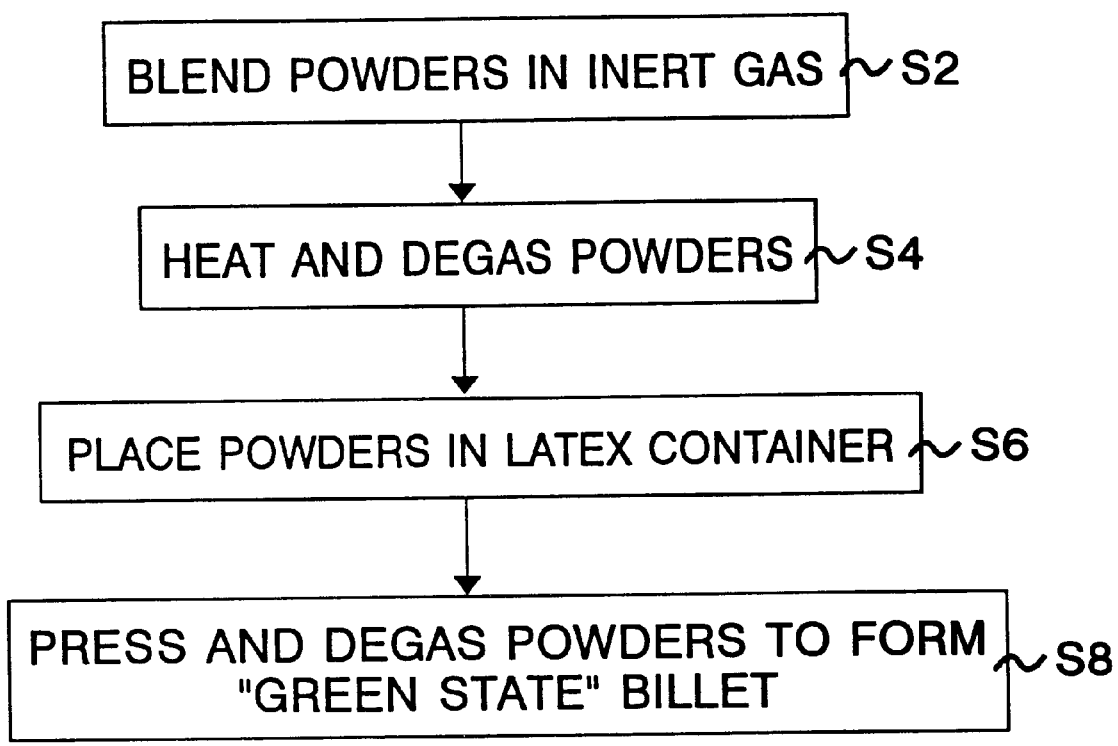
FIG. 2 is a flow chart describing a process of consolidating the powder constituents of the composite according to an embodiment of the present invention.

For example, as described in the flow chart of FIG. 2, the ceramic-metal matrix composite may be formed by blending ceramic powder and aluminum or aluminum alloy powder in an inert gas at step S2, heating and degassing the powders at step S4, placing the degassed powders in a container such as a latex container, for example, at step S6, and then isostatically pressing the degassed powders at about 65,000 psi at step S8. The resulting "green-state" billets are then removed from the container and sintered.

Figure 3:
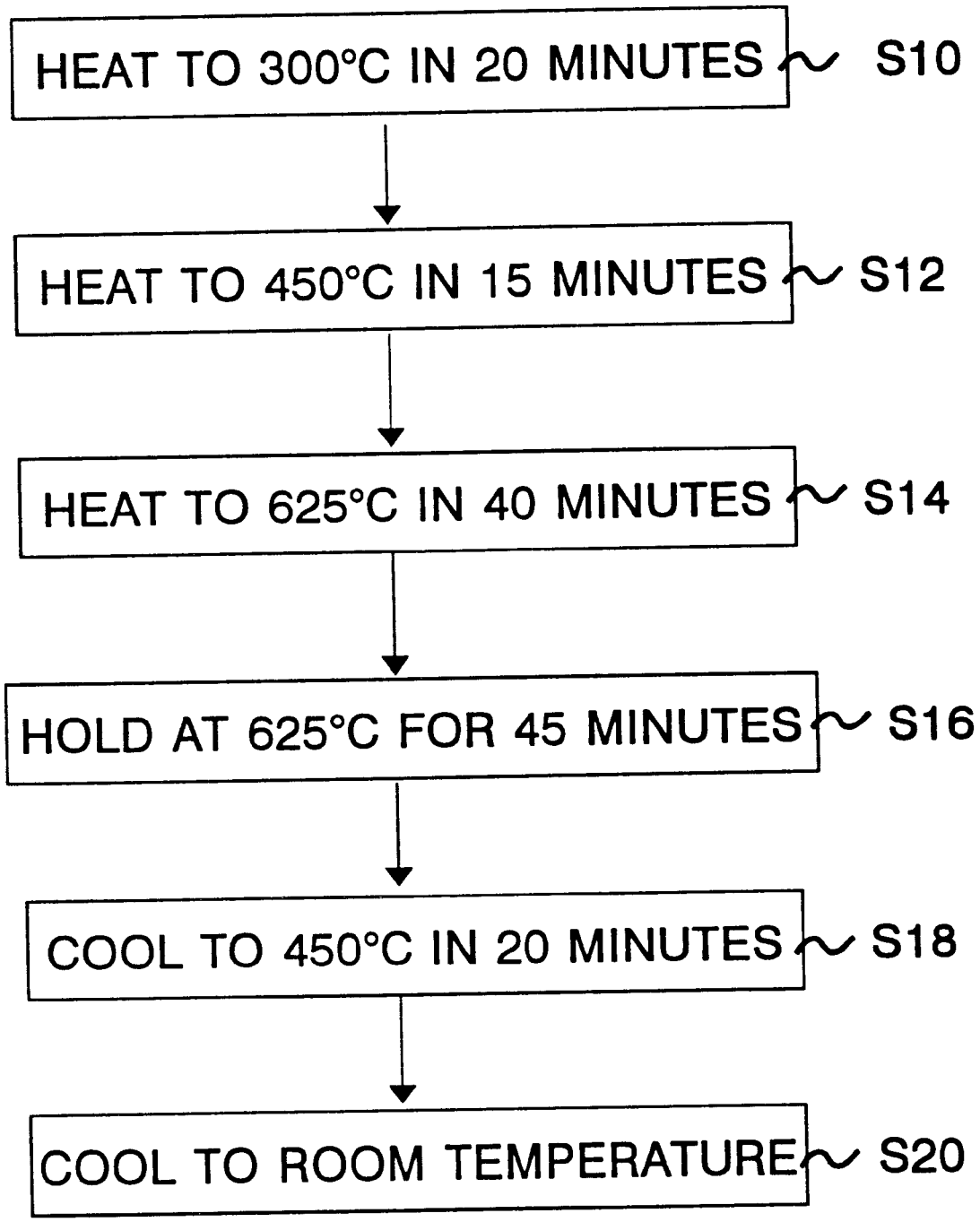
FIG. 3 is a flow chart describing a process of sintering the consolidated powders into a billet of the ceramic-metal matrix composite.

An example of a sintering process is described in the flow chart of FIG. 3. Variations of this sintering process may also be used. The "green-state" billets are heated at step S10 from room temperature to 300° C. during a 20 minute ramp period to burn off a majority of moisture or trapped water contained in the billets. The billets are then heated at step S12 to 450° C. during a 15 minute ramp period to burn off any remaining moisture or water vapor. Subsequently, the billets are heated at step S14 to 625° C. during a 40 minute ramp period and held at 625° C. at step S16 for 45 minutes. During this time sintering of the ceramic-metal matrix composite is accomplished. The sintered billets are then cooled at step 18 from 625° C. to 450° C. in 20 minutes using a nitrogen gas backfill. Finally, at step S20 the billets are cooled to room temperature.

The ceramic-metal matrix composites made by the above process have a density that depends on the type of ceramic and metal matrix materials used. For example, boron carbide-aluminum alloy metal matrix composites made by the above process have a density ranging from about 85% to 95% of theoretical density.

The composite material is then machined to meet the tolerances and specifications of subsequent processing steps using standard machining tools.

Figure 4:
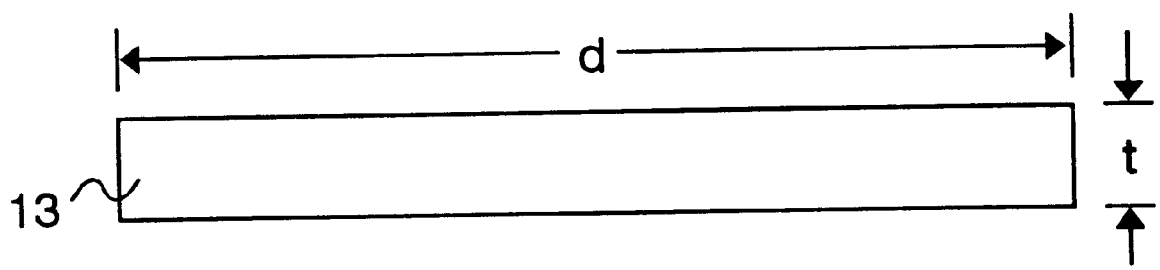
FIG. 4 is an elevational view of a cross section of a rigid disk substrate according to an embodiment of the present invention.

FIG. 4 schematically shows an elevational cross section of a rigid disk substrate 13 according to the present invention. The diameter d of the substrate 1 can be 5.25, 3.5, 2.5, or 1.8 inches to conform to standard sizes for rigid disk substrates. The thickness t of the substrate 13 is less than 1 mm and may be as thin as approximately 0.4 mm. The rigid disk substrate 13 can be rotated from 0 through 12,000 rpm with significantly reduced deflection characteristics compared with conventional disk substrates, and therefore can be routinely operated at any rotation speed between 0 and 12,000 rpm without excessive head slap caused by deflection of the substrate 13.

In another embodiment of the present invention, a rigid disk substrate is formed of a boron carbide-metal matrix composite wherein the metal matrix material is aluminum or an aluminum alloy having a purity of approximately 97% when in powder form. The balance of the metal matrix material may contain trace amounts of various elements such as chromium, copper, iron, magnesium, silicon, titanium, and zinc. The boron carbide powder used in forming the composite has a purity of greater than 99.5%. The boron carbide can be characterized as $B_4C$ and is comprised of approximately 77% boron and 22% carbon by weight. Included in the boron carbide powder may be silicon, iron, and aluminum, which are present in an amount less than 3.0% by weight. Trace amounts of magnesium, titanium, and calcium may also be included.

Figure 5:
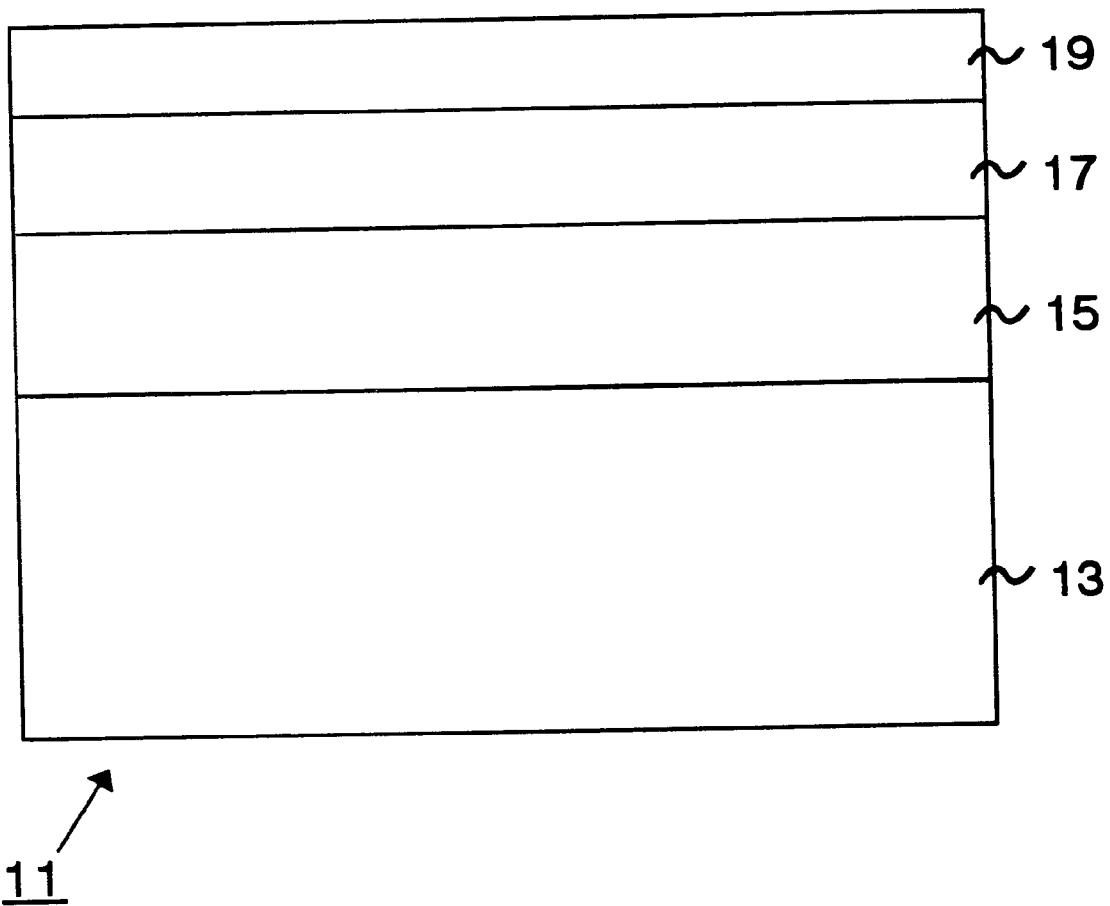
FIG. 5 is an elevational view of a cross section of a magnetic recording disk according to an embodiment of the present invention.

In an embodiment of the present invention, a magnetic recording disk 11, schematically shown in FIG. 5, is comprised of a rigid disk substrate 13 formed of a ceramic-metal matrix composite, a nickel phosphorous layer 15 overlaying the substrate 13, a magnetic recording layer 17 covering the nickel-phosphorous layer 15, and a protective coating layer 19 covering the magnetic recording layer 17. The nickel-phosphorous layer 15 is approximately 10 to 20 $\mu$m thick and is deposited onto the substrate 13 by plating techniques. The deposited nickel-phosphorous layer 15 is polished and textured to produce a grooved surface that assists and improves head aerodynamics. The magnetic recording layer 17 is a thin film of a cobalt-based alloy such as cobalt-platinum-chromium having a thickness of approximately 200 to 500 nm. Other magnetic material of sufficiently high storage density may also be used for the magnetic recording layer 17. The protective coating layer 19 is deposited to a thickness of approximately 10 to 50 nm to protect the magnetic recording layer 17. The protective coating layer 19 may be a sputter-deposited carbon layer or it may be any other non-magnetic hard coating.

Figure 6:
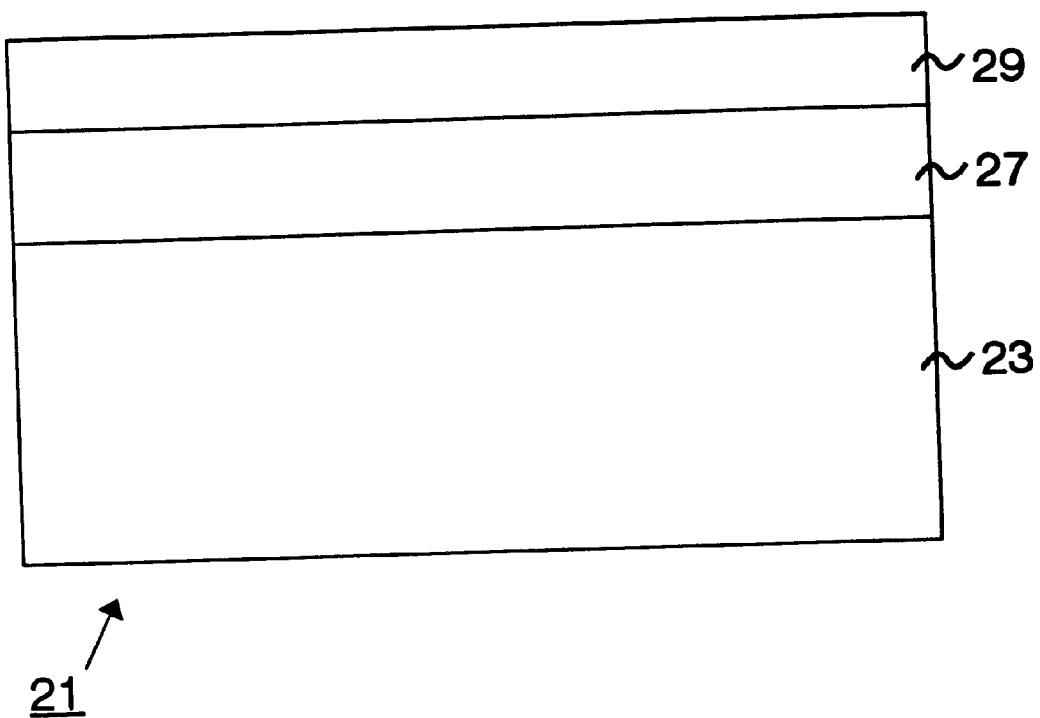
FIG. 6 is an elevational view of a cross section of a magnetic recording disk according to another embodiment of the present invention.

In another embodiment of the present invention, as schematically shown in FIG. 6, a magnetic recording disk 21 is comprised of a rigid disk substrate 23 formed of a ceramic-metal matrix composite, a magnetic recording layer 27 covering the substrate 23, and an optional protective coating layer 29 covering the magnetic recording layer 27. Instead of having a nickel-phosphorous layer, the substrate 23 itself is polished and textured to produce a grooved surface to assist and improve head aerodynamics. The magnetic recording layer 27 is a thin film of a high storage-density magnetic material. The optional protective coating 29 of a non-magnetic hard layer such as sputtered carbon, for example, may be omitted because the rigid disk substrate exhibits minimal deflection at rotation speeds from 0 through 12,000 rpm so that the magnetic recording disk will experience few, if any, head slaps.

The embodiments described above are illustrative examples of the present invention and it should not be construed that the present invention is limited to these particular embodiments. Various changes and modifications may be effected by one skilled in the art without departing from the spirit or scope of the invention as defined in the appended claims. For example, although single-sided magnetic disk recording media are described above, the present invention also encompasses double-sided magnetic disk recording media, in which top and bottom magnetic recording layers are supported by top and bottom surfaces of a single rigid disk substrate.

What is claimed is:

1. A disk substrate for magnetic disk recording media, comprising:

a disk formed of a metal matrix composite material having a composition ranging from about 1 to 40 weight % of ceramic material and about 60 to 99 weight % of an aluminum or an aluminum alloy metal matrix material.

2. A disk substrate for magnetic disk recording media according to claim 1, wherein the ceramic material is selected from the group consisting essentially of silicon carbide, aluminum oxide, boron carbide, magnesium oxide, silicon oxide, zirconium oxide, beryllium oxide, titanium carbide, titanium boride, tungsten carbide, and combinations thereof.

3. A disk substrate for magnetic disk recording media according to claim 1, wherein the metal matrix composite disk has a thickness less than 1 mm.

4. A disk substrate for magnetic disk recording media according to claim 1, wherein the metal matrix composite is formed by a process that does not require melting of the aluminum or aluminum alloy metal matrix material.

5. A disk substrate for magnetic disk recording media according to claim 1, wherein the metal matrix composite disk exhibits reduced deflection compared with aluminum or aluminum alloy disks when rotated at rotation speeds less than about 12,000 revolutions per minute.

6. A magnetic recording disk comprising:
  a rigid disk substrate formed of a metal matrix composite having a composition ranging from about 1 to 40 weight % of ceramic material and about 60 to 99 weight % of an aluminum or an aluminum alloy;
  a nickel-phosphorous layer supported by the rigid disk substrate; and
  a magnetic recording layer covering the nickel-phosphorous layer.

7. A magnetic recording disk according to claim 6, wherein the metal matrix composite is formed by a process that does not require melting of the metal matrix material.

8. A magnetic recording disk according to claim 6, wherein the ceramic material is selected from the group consisting essentially of silicon carbide, aluminum oxide, boron carbide, magnesium oxide, silicon oxide, zirconium oxide, beryllium oxide, titanium carbide, titanium boride, tungsten carbide, and combinations thereof.

9. A magnetic recording disk according to claim 6, wherein the rigid disk substrate exhibits a characteristic of reduced deflection compared with aluminum or aluminum alloy disk substrates when rotated at rotation speeds less than about 12,000 revolutions per minute.

* * * * *